US008701121B2

(12) United States Patent
Saffre

(10) Patent No.: US 8,701,121 B2
(45) Date of Patent: Apr. 15, 2014

(54) METHOD AND SYSTEM FOR REACTIVE SCHEDULING

(75) Inventor: Fabrice Saffre, Abu Dhabi (AE)

(73) Assignees: Khalifa University of Science, Technology and Research, Abu-Dhabi (AE); British Telecommunications plc, London (GB); Emirates Telecommunications Corporation, Abu-Dhabi (AE)

( * ) Notice: Subject to any disclaimer, the term of this patent is extended or adjusted under 35 U.S.C. 154(b) by 0 days.

(21) Appl. No.: 13/169,488

(22) Filed: Jun. 27, 2011

(65) Prior Publication Data

US 2012/0331476 A1 Dec. 27, 2012

(51) Int. Cl.
*G06F 9/46* (2006.01)

(52) U.S. Cl.
USPC .......... 718/104

(58) Field of Classification Search
None
See application file for complete search history.

(56) References Cited

U.S. PATENT DOCUMENTS 7,783,852 B2 * 8/2010 Lahiri et al. .......... 711/170
8,046,766 B2 * 10/2011 Rhine .......... 718/104
2006/0242648 A1 10/2006 Guccione et al.
2007/0282651 A1 12/2007 Naik et al.
2008/0091289 A1 4/2008 Gozzi et al.
2008/0313642 A1 12/2008 Karaoguz et al.
2009/0282415 A1 11/2009 An et al.
2010/0228861 A1 * 9/2010 Arsovski et al. .......... 709/226
2011/0145094 A1 6/2011 Dawson et al.
2011/0161964 A1 * 6/2011 Piazza et al. .......... 718/102

FOREIGN PATENT DOCUMENTS

WO 2009/122374 10/2009

OTHER PUBLICATIONS

"Satisfying User Preferences While Negotiating Meetings" by Sen, et al., International Journal of Human-computer Studies / International Journal of Man-machine Studies—IJMMS , vol. 47, No. 3, pp. 407-427, 1997.

European Search Report for corresponding European Patent Application Serial No. 11193743.9 dated Apr. 12, 2012.

* cited by examiner

*Primary Examiner* — Gregory A Kessler

(74) *Attorney, Agent, or Firm* — Calfee Halter & Griswold LLP

(57) ABSTRACT

A method and system of scheduling demands on a system having a plurality of resources are provided. The method includes the steps of, on receipt of a new demand for resources: determining the total resources required to complete said demand and a deadline for the completion of that demand; determining a plurality of alternative resource allocations which will allow completion of the demand before the deadline; for each of said alternative resource allocations, determining whether, based on allocations of resources to existing demands, said alternative resource allocation will result in a utilization of resources which is closer to an optimum utilization of said resources; and selecting, based on said determination, one of said alternative resource allocations to complete said demand so as to optimise utilization of resources of the system.

29 Claims, 5 Drawing Sheets

20
22
16
40
15
12
18
30
14
10

METHOD AND SYSTEM FOR REACTIVE SCHEDULING

FIELD OF THE INVENTION

The present invention relates to a method and system for scheduling of demands on the resources of a system so as to optimize the utilization of those resources. It is particularly, but not exclusively concerned with "reactive" scheduling, i.e. scheduling at run-time.

BACKGROUND OF THE INVENTION

In many fields of technology it is important to be able to efficiently allocate resources to the demands on those resources. In particular, it may be desirable to allocate resources in a way which minimizes operational costs whilst maintaining a desired level of service (i.e. meeting the demands and ensuring timely processing of the demands). A number of problems arise in respect of this general proposition, principally in relation to dimensioning (how many/how much resource(s) are/is required in order to ensure that the demands are met) and scheduling (how the available resources should be allocated in order to meet the demands).

Examples of fields in which such problems arise are numerous, and include the management of demands on available electrical power (or other utilities such as oil, water or gas), the allocation of computing resources (e.g. processing power and time or memory resources) to tasks or storage requirements, the allocation of bandwidth in a communications pathway such as a telephone or computer network to users of that pathway, as well as the management of demands on other finite resources such as production capacity in a factory or beds in a hospital.

Fluctuations in the demand are likely to impact negatively on predictability, making planning ahead very difficult. In the computing field, this is part of the rationale for "on-demand" or "utility" computing, such as provided by "cloud computing".

In respect of scheduling, the allocation of resources at different times may be relatively more or less desirable due to differences in the "cost" (which may be financial or technical) of providing the necessary resources at a particular time. This can depend on external factors, such as the price of electricity varying over a 24 hour cycle.

The concept of optimal resource allocation can be most readily understood in financial terms, although it is equally applicable where "costs" are, for example, power consumption, network efficiency, etc.: if certain conditions are met (including in terms of the pricing model), there will be, at any time, a given amount of resources for which the difference between the income generated by and the operational expenses incurred from committing said amount peaks. This particular value is obviously a "sweet spot". This can arise where the "price" for the execution of a task is fixed, but the "cost" of the resources being used increases with total volume of resources being allocated (this is a typical offer vs demand scenario in which the price per unit increases as a finite resource becomes scarcer). Alternatively, the resource "cost" may be fixed but the "price charged" for execution decreases (in financial terms this could arise if a customer is given an incremental discount when increasing use of the service). Combinations of such balancing may exist, which may result in multiple "sweet spots".

The present invention aims to provide a way of controlling the allocation of resources so as to shape the load such that, at any given time, the amount of resources needed to meet the agreed quality of service target for the accepted requests comes as close as possible to the instantaneous ideal value.

Although methods of allocating resources are known, these methods tend to either be determinative (i.e. calculate the optimized allocation in advance) and so do not take account of real-time conditions in the system, or if dynamic (i.e. operate at run-time), do not result in significant improvements in optimizing resource use.

Examples of known dynamic (also referred to as "run-time" or "reactive") scheduling strategies are set out below.

"First Come-First Served": this strategy allocates resources to a task as soon as it arrives/is demanded. As a result, there is no optimization of the allocation of resources and the result is resource hogging by long-running, non-urgent processes and sub-optimal optimization for shorter processes. This is the simplest form of run-time scheduling and so is generally treated as the benchmark for alternative optimization approaches.

"Predictable Maximum Waiting Time": this strategy causes the priority of an unscheduled task to increase over time until it is eventually allocated the necessary resources. This ensures that a task is performed within a predictable time period from arrival, but provides no optimization of resource utilization. In particular, an overdue process may end up having sufficient priority to be executed at a time which is very sub-optimal in terms of resource utilization.

"Earliest Deadline First": this strategy prioritises task based on their deadline and is used to ensure that critical tasks are not delayed by the scheduling. However it is rarely successful in achieving any optimisation of the resource utilisation. Furthermore, if most tasks are equally urgent, this strategy effectively ends up as a "First Come-First Served" strategy.

"Shortest Job First": this strategy aims at maximizing throughput of tasks by scheduling the shortest tasks first. This is rarely an optimal scheduling strategy, both in terms of meeting deadlines and resource utilization, unless there is prior knowledge that short processes are likely to be the most urgent.

It is therefore an object of the present invention to provide a method and system for scheduling demands on a system which is able to operate dynamically during the operation of the system and which optimizes, and preferably improves, the use of the resources of the system.

It is an object of the present invention to provide a method and system for reactive scheduling of demands which ensures that deadlines are met.

It is an object of the present invention to provide a method and system for reactive scheduling of demands which demonstrates improved resource utilization compared to the benchmark of a "first come-first served" scheduling strategy.

It is preferable that the method and system of the present invention are simple and do not rely on global knowledge or historical data.

SUMMARY OF THE INVENTION

An exemplary method of scheduling demands on a system having a plurality of resources which can be allocated to said demands comprises, on receipt of a new demand for resources, (a) determining the total resources required to complete said demand and a deadline for the completion of that demand; (b) determining a plurality of alternative resource allocations which will allow completion of the demand before the deadline; (c) for each of said alternative resource allocations, determining whether, based on allocations of resources to existing demands, said alternative resource allocation will result in a utilization of resources which is closer to an optimum utilization of said resources; and (d) selecting, based on said determination in (c), one of said alternative resource allocations to complete said demand so as to optimize utilisation of resources of the system.

An exemplary system comprises a plurality of resources which are allocatable to demands requested by one or more users of the system and a resource allocation device which is arranged to determine allocation of said resources to said demands, wherein, on receipt of a new demand for resources, the resource allocation device is arranged to: (a) determine the total resources required to complete said demand and a deadline for the completion of that demand; (b) determine a plurality of alternative resource allocations which will allow completion of the demand before the deadline; (c) for each of said alternative resource allocations, determine whether, based on allocations of resources to existing demands, said alternative resource allocation will result in a utilization of resources which is closer to an optimum utilization of said resources; and (d) select, based on said determination in (c) above, one of said alternative resource allocations to complete said demand so as to optimize utilisation of resources of the system, and further wherein said system allocates resources to said demand according to the alternative resource allocation selected.

An exemplary computer program for running on a computer system to allocate resources of that computer system to a plurality of demands made by one or more users of the computer system comprises carrying out the steps of, on receipt of a new demand for resources: (a) determining the total resources required to complete said demand and a deadline for the completion of that demand; (b) determining a plurality of alternative resource allocations which will allow completion of the demand before the deadline; (c) for each of said alternative resource allocations, determining whether, based on allocations of resources to existing demands, said alternative resource allocation will result in a utilization of resources which is closer to an optimum utilization of said resources; and (d) selecting, based on said determination in (c), one of said alternative resource allocations to complete said demand so as to optimize utilisation of resources of the system.

An exemplary method of scheduling processor utilization on a computer system having a plurality of processors that can be allocated to incoming processing tasks comprises, in response to receiving a request for a new processing task: (a) determining processor resources required to complete the new processing task and a deadline for the completion of that new processing task; (b) determining a plurality of different processor subsets that will allow completion of the new processing task before the deadline; (c) determining a plurality of alternative execution start times between the time of receipt of the request for the new processing task and the deadline that will allow completion of the new processing task before the deadline, and for each alternative execution start time, a plurality of timeslots during which processing will take place in order to allow completion of the new processing task before the deadline; (d) for each of the timeslots, determining whether, based on a current allocation of processors with respect to already scheduled processing tasks, use of said processor subset in said timeslot will result in a utilization of processors in said timeslot that is closer to an optimum utilization of said processors; (e) selecting, based on said determination in step d), one of said alternative execution start times to complete said new processing task so as to optimize processor utilisation for each of said processor subsets; (f) selecting, based on said determination in step d), one of said subsets of processors so as to optimize processor utilization; and (g) executing code corresponding to the new processing task in accordance with the selected execution start time using a number of processors corresponding to the selected subset.

An exemplary computer system comprises (a) a plurality of processors that can be allocated to incoming processing tasks and (b) a control unit configured to allocate various combinations of the processors to various processing tasks, wherein the control unit is programmed to, in response to receiving a request for a new processing task: (1) determine processor resources required to complete the new processing task and a deadline for the completion of that new processing task; (2) determine a plurality of different processor subsets that will allow completion of the new processing task before the deadline; (3) determine a plurality of alternative execution start times between the time of receipt of the request for the new processing task and the deadline that will allow completion of the new processing task before the deadline, and for each alternative execution start time, a plurality of timeslots during which processing will take place in order to allow completion of the new processing task before the deadline; (4) for each of the timeslots, determine whether, based on a current allocation of processors with respect to already scheduled processing tasks, use of said processor subset in said timeslot will result in a utilization of processors in said timeslot that is closer to an optimum utilization of said processors; (5) select, based on said determination in 4), one of said alternative execution start times to complete said new processing task so as to optimize processor utilisation for each of said processor subsets; (6) select, based on said determination in 4), one of said subsets of processors so as to optimize processor utilization; and (7) direct a number of processors corresponding to the selected subset to execute code corresponding to the new processing task.

BRIEF DESCRIPTION OF THE DRAWINGS

Embodiments of the invention will now be described by way of example with reference to the accompanying drawings in which.

DETAILED DESCRIPTION

Figure 1:
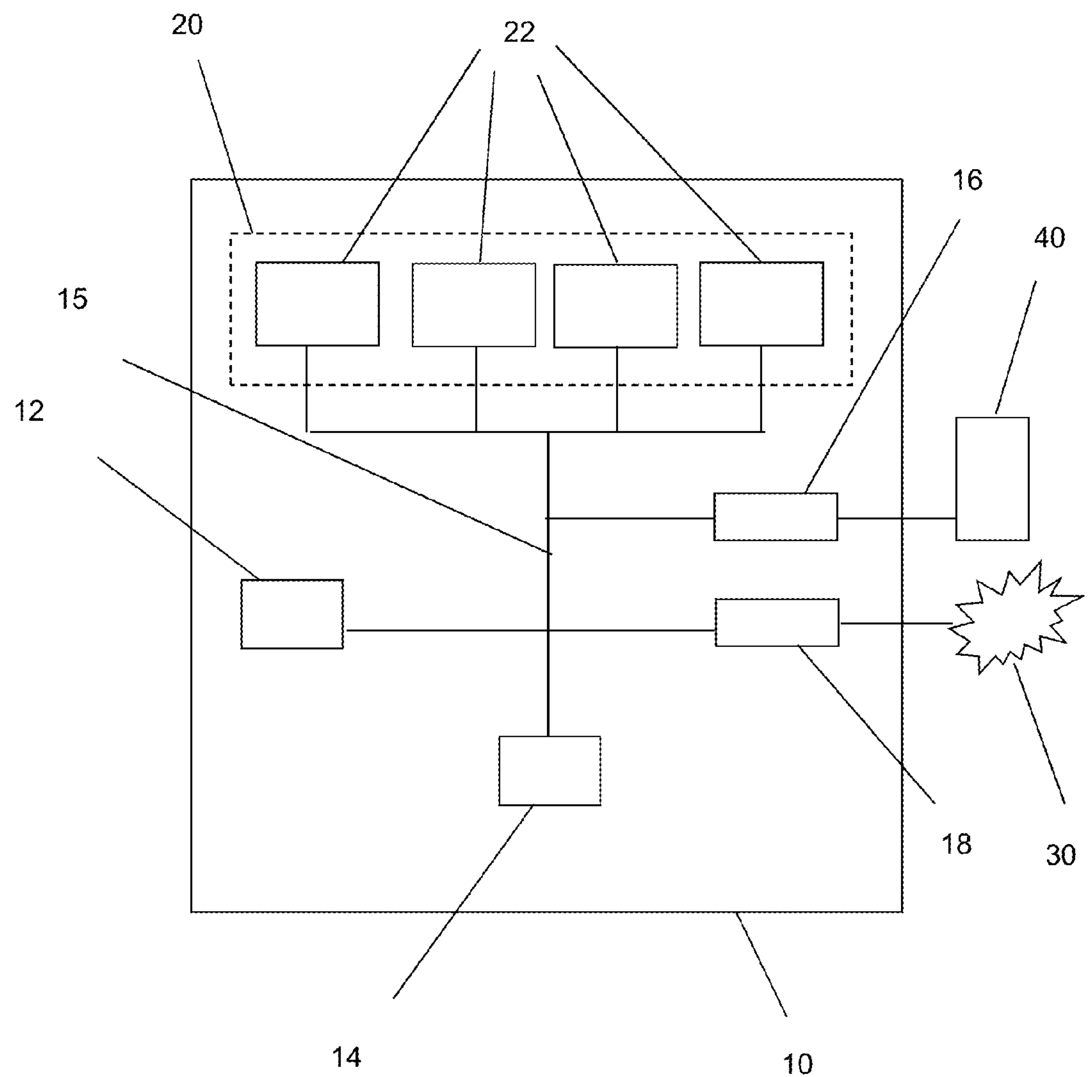
FIG. 1 is a schematic block diagram showing an exemplary embodiment.

At its broadest, the present invention provides a method of scheduling demands on a system which involves determining, at run-time, a resource allocation to complete a newly arrived task which will have the collective effect of improving utilization of the resources of the system.

A first aspect of the present invention provides a method of scheduling demands on a system having a plurality of resources which can be allocated to said demands, the method including the steps of, on receipt of a new demand for resources:

a) determining the total resources required to complete said demand and a deadline for the completion of that demand;

b) determining a plurality of alternative resource allocations which will allow completion of the demand before the deadline;

c) for each of said alternative resource allocations, determining whether, based on allocations of resources to existing demands, said alternative resource allocation will result in a utilization of resources which is closer to an optimum utilization of said resources; and d) selecting, based on said determination in step c), one of said alternative resource allocations to complete said demand so as to optimise utilization of resources of the system.

Preferably the effect of optimizing the utilisation of resources of the system is to, at the time of selecting, result in an allocation of the resources of the system which is optimized given the existing demands on the system both at the time of selecting and at future times. In the majority of cases, the overall utilization of the resources of the system will be sub-optimal at at least one time in the future, and may be sub-optimal at all times in the future due to as yet unknown demands on the system and the deadlines for the completion of those demands. This is because the method preferably schedules demands at submission time so as to approximate ideal resource allocation based on necessarily incomplete information about future demands.

Preferably the alternative resource allocation selected will result in an increase in the allocation of resources at times in the future when the utilization of resources is less than the optimum utilization. However, in order to balance the demands on the resources, and the deadlines for completing each demand, alternative resource allocations may be selected which result in an increase in the allocation of resources at times when the allocation is already in excess of the optimum for that time, for example if this is necessary to ensure that the deadline for the completion of the demand is met, or if such an allocation results in a utilization which is more optimal for other times thereby resulting in an overall allocation of resources which is closer to the optimum for all future times.

By making the determination and selection of a resource allocation from amongst the alternative resource allocations, the method according to this aspect operates at run-time so to attempt to optimise the operation of the system going forward. Accordingly, the method of this aspect is able to take account of existing demands on the system on receipt of a new demand and to determine an allocation of resources to satisfy the new demand which contributes best to optimisation of the utilization of the resources.

Typically the optimum utilization of the resources of the system will vary with time. This may be due to external factors influencing the optimum utilization, for example due to the varying cost of electricity over a 24 hour cycle, or may be due to internal factors such as routine maintenance of the system. The variation in the optimum utilization preferably follows a pattern known in advance so that the method is able to know the optimum utilization at times between receipt of the demand and the deadline for completion of the demand. However, this is typically a much shorter timescale than existing determinative optimization methods require to allow long term planning of resource allocation.

The alternative resource allocations may include the allocation of different amounts of said resources to said demand at a particular point in time. Alternatively or additionally the alternative resource allocations may include starting said demand at a plurality of different start times between the time of receipt of the demand and the deadline.

Although in theory a wide range of alternative resource allocations may be considered, because each alternative resource allocation that is considered adds complexity to the method and so increases demand on the system implementing the method (e.g. in terms of processing time in a computer-based system) and/or the time taken to determine a resource allocation to be followed, it is preferable that only a subset of the total number of possible resource allocations is considered so as to simplify the processing.

The exact simplifications chosen may be selected based on the particular implementation of the method of this aspect. However, simplifications that may be used include one or more of the following:

allocating resources only in a contiguous manner (i.e. so that once resources have been allocated to the demand, they remain allocated until the demand is completed);

allocating the same amount of resources over the entire period of performance of the demand; and allocating resources only in predetermined quantities.

In one embodiment of the method of this aspect, the step c) of determining includes the sub-steps of:

c1) determining, for each of a plurality of timeslots between the time of receipt of the new demand and the deadline, whether, based on allocations of resources to existing demands, said alternative resource allocation will result in a utilization of resources in said timeslot which is closer to an optimum utilization for said timeslot; and c2) collating the results of said determination in step c1) to generate a value indicating the desirability of each of said alternative resource allocations, and step d) of selecting selects based on said generated values.

By breaking down the time between the receipt of the demand and the deadline into a series of discrete timeslots, it is possible to analyse the impact of scheduling the demand to be carried out in one or more of those timeslots on the use of the system's resources in each of those timeslots. This allows the effect of each alternative allocation to be determined over all of the timeslots which it affects and allowance made for the fact that certain allocations may result improved utilization (closer to optimum) in a particular timeslot, but cause over-utilization in another timeslot.

In particular said value may be the proportion of said plurality of timeslots in which said alternative resource allocation will result in a utilization of resources which is closer to an optimum utilization for said timeslot.

The selection may select the alternative resource allocation with the highest value.

If a plurality of alternative resource allocations result in generation of values which are equal, the step of selecting preferably selects the alternative resource allocation which starts earliest in time.

Although a number of different implementations of this method are envisaged, particular implementations are envisaged wherein said system is a computer system and said demands are tasks to be performed by said computer system, wherein said system is an electrical grid and said demands are loads on said grid and wherein said system is a communications pathway such as a telephone or computer network and said demands are requirements for bandwidth on said network.

The method of the present aspect may include any combination of some, all or none of the above described preferred and optional features.

The method of the present aspect is preferably implemented in a system according to the second aspect of this invention, as described below, but need not be.

A second aspect of the present invention provides a system having a plurality of resources which are allocatable to demands requested by one or more users of the system, the system further comprising a resource allocation device which is arranged to determine allocation of said resources to said demands, wherein, on receipt of a new demand for resources, the resource allocation device is arranged to:

a) determine the total resources required to complete said demand and a deadline for the completion of that demand;

b) determine a plurality of alternative resource allocations which will allow completion of the demand before the deadline;

c) for each of said alternative resource allocations, determine whether, based on allocations of resources to existing demands, said alternative resource allocation will result in a utilization of resources which is closer to an optimum utilization of said resources;

d) select, based on said determination in c) above, one of said alternative resource allocations to complete said demand so as to optimize utilization of resources of the system, and further wherein said system allocates resources to said demand according to the alternative resource allocation selected.

Preferably the effect of optimizing the utilisation of resources of the system is to, at the time of selecting, result in an allocation of the resources of the system which is optimized given the existing demands on the system both at the time of selecting and at future times. In the majority of cases, the overall utilization of the resources of the system will be sub-optimal at at least one time in the future, and may be sub-optimal at all times in the future due to as yet unknown demands on the system and the deadlines for the completion of those demands. This is because the system preferably schedules demands at submission time so as to approximate ideal resource allocation based on necessarily incomplete information about future demands.

Preferably the alternative resource allocation selected will result in an increase in the allocation of resources at times in the future when the utilization of resources is less than the optimum utilization. However, in order to balance the demands on the resources, and the deadlines for completing each demand, alternative resource allocations may be selected which result in an increase in the allocation of resources at times when the allocation is already in excess of the optimum for that time, for example if this is necessary to ensure that the deadline for the completion of the demand is met, or if such an allocation results in a utilization which is more optimal for other times thereby resulting in an overall allocation of resources which is closer to the optimum for all future times.

By making the determination and selection of a resource allocation from amongst the alternative resource allocations, the system according to this aspect is able to optimise its operation at run-time. Accordingly, the system of this aspect is able to take account of existing demands on it when a new demand is received and to determine an allocation of resources to satisfy the new demand which contributes best to optimisation of the utilization of the resources.

Typically the optimum utilization of the resources of the system will vary with time. This may be due to external factors influencing the optimum utilization, for example due to the varying cost of electricity over a 24 hour cycle, or may be due to internal factors such as routine maintenance of the system. The variation in the optimum utilization preferably follows a pattern known in advance so that the method is able to know the optimum utilization at times between receipt of the demand and the deadline for completion of the demand. However, this is typically a much shorter timescale than existing determinative optimization methods require to allow long term planning of resource allocation.

The alternative resource allocations may include the allocation of different amounts of said resources to said demand at a particular point in time. Alternatively or additionally the alternative resource allocations may include starting said demand at a plurality of different start times between the time of receipt of the demand and the deadline.

Although in theory a wide range of alternative resource allocations may be considered, because each alternative resource allocation that is considered adds complexity to the method and so increases demand on the system implementing the method (e.g. in terms of processing time in a computer-based system) and/or the time taken to determine a resource allocation to be followed, it is preferable that only a subset of the total number of possible resource allocations is considered so as to simplify the processing.

The exact simplifications chosen may be selected based on the particular implementation of the system of this aspect. However, simplifications that may be used include one or more of the following:

allocating resources only in a contiguous manner (i.e. so that once resources have been allocated to the demand, they remain allocated until the demand is completed);

allocating the same amount of resources over the entire period of performance of the demand; and allocating resources only in predetermined quantities.

In one embodiment of this aspect, the resource allocation device is further arranged to:

determine, for each of a plurality of timeslots between the time of receipt of the new demand and the deadline, whether, based on allocations of resources to existing demands, said alternative resource allocation will result in a utilization of resources in said timeslot which is closer to an optimum utilization for said timeslot;

collate the results of said determinations for the plurality of timeslots to generate a value indicating the desirability of each of said alternative resource allocations; and select one of said alternative resource allocations based on said generated values.

By breaking down the time between the receipt of the demand and the deadline into a series of discrete timeslots, it is possible to analyse the impact of scheduling the demand to be carried out in one or more of those timeslots on the use of the system's resources in each of those timeslots. This allows the effect of each alternative allocation to be determined over all of the timeslots which it affects and allowance made for the fact that certain allocations may result improved utilization (closer to optimum) in a particular timeslot, but cause over-utilization in another timeslot.

In particular said value may be the proportion of said plurality of timeslots in which said alternative resource allocation will result in a utilization of resources which is closer to an optimum utilization for said timeslot.

The selection may select the alternative resource allocation with the highest value.

If a plurality of alternative resource allocations result in generation of values which are equal, the step of selecting preferably selects the alternative resource allocation which starts earliest in time.

Although a number of different implementations of this method are envisaged, in one particular implementation the system is a computer system and said demands are tasks to be performed by said computer system. In such a system, the resources may be processor time from the processor(s) of the system. The system may be a computer system having multiple processor cores and the resources can be the provision of one or more of said processor cores for a predetermined time period In an alternative implementation, the system is an electrical grid and said demands are loads on said grid.

In an alternative implementation, the system is a communications pathway such as a network and said demands are requirements for bandwidth of said communications pathway.

The system of the present aspect may include any combination of some, all or none of the above described preferred and optional features.

A third aspect of the present invention provides a computer program for running on a computer system to allocate the resources of that computer system to a plurality of demands made by one or more users of the computer system, the computer program carrying out the steps of, on receipt of a new demand for resources:

a) determining the total resources required to complete said demand and a deadline for the completion of that demand;

b) determining a plurality of alternative resource allocations which will allow completion of the demand before the deadline;

c) for each of said alternative resource allocations, determining whether, based on allocations of resources to existing demands, said alternative resource allocation will result in a utilization of resources which is closer to an optimum utilization of said resources; and d) selecting, based on said determination in step c), one of said alternative resource allocations to complete said demand so as to optimize utilization of resources of the system.

Preferably the effect of optimizing the utilisation of resources of the system is to, at the time of selecting, result in an allocation of the resources of the system which is optimized given the existing demands on the system both at the time of selecting and at future times. In the majority of cases, the overall utilization of the resources of the system will be sub-optimal at at least one time in the future, and may be sub-optimal at all times in the future due to as yet unknown demands on the system and the deadlines for the completion of those demands. This is because the program preferably schedules demands at submission time so as to approximate ideal resource allocation based on necessarily incomplete information about future demands.

Preferably the alternative resource allocation selected will result in an increase in the allocation of resources at times in the future when the utilization of resources is less than the optimum utilization. However, in order to balance the demands on the resources, and the deadlines for completing each demand, alternative resource allocations may be selected which result in an increase in the allocation of resources at times when the allocation is already in excess of the optimum for that time, for example if this is necessary to ensure that the deadline for the completion of the demand is met, or if such an allocation results in a utilization which is more optimal for other times thereby resulting in an overall allocation of resources which is closer to the optimum for all future times.

Typically the computer system has a memory and a processor and the program is loaded into the memory and run on the processor. The memory and processor may be part of a management computer which is separate from the parts of the computer system which provide the resources to the users.

The resources may be the processor time of the computer system. This can be set out in terms of the number of operations, or the allocation of a particular amount of processor capacity for a particular length of time.

Alternatively, the resources may be network bandwidth in the computer system.

In a particular arrangement the computer system has multiple processor cores and the resources are the provision of one or more of said processor cores for a predetermined time period.

An embodiment of the present invention will now be described in relation to the scheduling of computer resources.

FIG. 1 shows, in schematic form, a computer system 10. The computer system 10 has a CPU 20 which has a plurality of CPU cores 22. The CPU cores 22 are connected by a bus 15 to a memory device 12, a control unit 14, a network interface 18 and a service interface 16.

The network interface 18 connects the computer system 10 to a network 30 which may be any known network arrangement and work on any known networking protocol. A plurality of further computer systems (not shown) are connected to the network and thereby to the computer system 10.

Memory device 12 may include a plurality of memory devices, such as RAM devices, flash memory devices, disk drives, etc.

The service interface 16 connects the computer system 10 to a management computer 40. The management computer 40 typically has a CPU, memory and one or more input devices (such as a keyboard or mouse—not shown) and one or more output devices (such as a monitor or printer—not shown).

In the embodiment of the present invention, the control unit 14 operates to schedule tasks received by the computer system 10 into the network interface 18. The tasks are intended to be processed by the CPU 20. On receipt of a new task, the control unit determines the preferred scheduling of the task using a method according to the present invention, based on the information supplied with the task (amount of resource required, deadline for completion, etc.), and information about the future intended utilization of the CPU cores 22 which may be read from a table stored in the memory device 12. Before and/or after scheduling, the information associated with the task is stored into the memory device 12 so that it can be read out by one or more of the CPU cores 22 when the task is scheduled to be processed.

Once the control unit 14 has determined the scheduling of a newly arrived task, the control unit stores information concerning the allocated scheduling in the memory device 12. This information is preferably stored in association with the existing data concerning the task and also stored into the table which stores information about the future intended utilization of the CPU cores 22 and which is accessed by the control unit 14 when determining the preferred scheduling of a newly arrived task.

The management computer 40 can be used by a manager of the computer system 10 to manage the operation of the computer system. In particular, the manager can use the management computer 40 to set an optimum utilization of the CPU cores 22 of the computer system. This optimum utilization is stored in the memory device 12 and is used by the control unit 14 in determining the preferred scheduling of a newly arrived task.

In an alternative embodiment, the computer system 10 is a stand-alone system (i.e. it is not connected to a network 30), and the tasks are tasks that are given to the computer system by the manager using the management computer 40.

A method according to an embodiment of the present invention that is used by the control unit 14 of the computer system 10 described above to schedule the tasks arriving will now be described.

In order to clearly demonstrate the operation of the invention, the embodiment contains a number of simplifications and it will be appreciated by a person skilled in the art that such simplifications are not essential to the operation of the invention and that one, some or all of the simplifications could be removed in alternative implementations of the present invention.

In general terms, the embodiment provides a method of allocation and scheduling of "resource units" (a unit being a certain amount of the resource multiplied by the duration of a time-slot). In the specific example of the present embodiment, these units are computing resources and so relate to processor time (one "unit" is one CPU core for one second).

A first simplification in the present embodiment is that each processing task can be described using only two variables:

a) The total amount of the managed resource required for its execution (the number of required resource units).

b) The time (measured from its submission) by which it must be completed (deadline).

A second simplification is that the resource allocation is completely free from constraints, provided that the total resource allocated matches the resource requirements of the task and that the deadline is respected. In other words, if a task requires a given number of resource units in total it can be decomposed into any convenient combination of such units. For instance, a task requiring 16 "core-seconds" to complete could equally be carried out by one dual-core CPU over 8 seconds or by one quad-core CPU over 4 seconds.

A third simplification is an assumption that the execution of every task requires a multiple of 4 units in total, and that, when admitted, it is allocated 1, 2 or 4 processor cores per second for its entire duration. So, for instance, the above task requiring 16 core-seconds will be executed either in 4 seconds on a quad-core processor, or in 8 seconds on a dual-core processor or in 16 seconds on a single-core processor, and not in some combination of different processors.

It will be readily understood by the person skilled in the art that other discretization schemes could be applied. However, care should be taken in the structuring of any discretization to ensure that the combinatorial complexity of the overall method (and therefore computing resources required to administer it) does not exceed the benefit.

As a result of this third simplification only three separate sets of execution time windows (one for each amount of resource committed) need evaluation for each task.

The fourth simplification is that, once execution has started, a task is processed continuously (and at the chosen "rate" of one, two or four units per time-slot) until completed. In other word, execution cannot be interrupted or distributed, i.e. split between non-adjacent time-slots. Again, there are ways in which this assumption can be relaxed, but care should be paid to any consequent increase in complexity.

Each time-slot has an associated "agent" which is responsible for the management of the system during that time-slot. This agent is typically a background program and may in fact run as a single program in respect of all time slots. The separation into individual "agents" assists in the explanation of the present embodiment and so will be maintained.

Upon receiving a request for executing a task, the agent responsible for the current timeslot "organizes" three separate votes, one for each amount of resource which could be committed to the task. Denoting the submission time t, the deadline (or maximum time to completion) d, the total required resource R and the resource per time-step r, the votes can be described as follows.

Each vote involves the agents representing the d time-slots following submission (i.e. all possible time-slots in which the task could be performed). Each of these agents calculates whether adding r to their existing commitment Rc (these are future time-slots) would bring them closer to their optimal resource usage R*, i.e. whether $|R^*-Rc|>|R^*-(Rc+r)|$. If this is the case, they return a "yes" vote, indicating their "willingness" to allocate r resource units to the newly arrived task (otherwise, obviously, they vote "no"). There are d−R/r execution time-windows of duration R/r each. For each one of these, the votes of the agents managing the corresponding time-slots are counted.

The score of each possible execution time-window is defined as the fraction of "yes" votes within the R/r total. The time-window with the highest score is declared the "candidate" for one particular value of r (so, under the simplifications of this embodiment, there will be 3 candidates at the end of this first "round", corresponding to r=1, r=2 and r=4). In case of equality, the chosen candidate is the earliest execution window.

The overall winner is decided by comparing the scores of the three candidates (note that, because they each represent the preferred choice of a different number of voters, it is important in this embodiment that the score is representative of the fraction and not the absolute number of "yes" votes). In case of equality, the lowest r (slowest execution) wins.

This election result completely determines when the task will be executed and how many resources will be allocated to it (and therefore how long it will take to complete). It guarantees that:

a) The deadline will be respected.

b) Execution is scheduled so as to maximize efficiency (e.g. the difference between income and operational expenses) at the time when the task was submitted (local optimum).

In order to demonstrate quantitatively the effect of applying the method of this embodiment to various workloads and resource utilization targets, some simulation studies were conducted. Three different scenarios were considered and simulated:

1) Random-Random: the rate of submission of new tasks is constant (although actual receipt of tasks is randomly distributed over time) and the resource utilization target fluctuates randomly about a long-term average value.

2) Random-Sine: the rate of submission of new tasks is constant as in a) above but the target utilization follows a deterministic sine-wave pattern over time.

3) Sine-Cosine: the resource utilization target follows a sine-wave over time as in b) above and the rate of submission presents a similar pattern but is out of phase by half a period (this scenario represents a hypothetical worst-case scenario, since demand peaks coincide with target troughs).

In all cases, the total requirements of a task (R) was a multiple of 4 □[16, 20, . . . , 256] (flat distribution) and the resource utilization target for every time-slot was an integer □[16, 17, . . . , 64], which either obeys a flat distribution (random) or follows a sine-wave function. In the latter case, the period was 1024 time-slots (i.e. 4 times longer than the maximum execution time of the heaviest task). Each numerical simulation involved 10,000 time-slots, the first and last 1000 of which are not included in statistics (as they correspond to a phase where the system can be far from steady state). The deadline or maximum time between submission and completion d was always set to twice the maximum execution time, i.e. d=2R. As previously mentioned, 3 values of r were considered for every submission (r=1, r=2 and r=4). The total number of tasks scheduled to run over the 10,000 time-slots of each experiment was set to 2,000, 3,000 or 4,000, which, given the other parameter values (average target utilization R* and average resource requirement per task R) correspond statistically to "underutilized", "roughly at capacity" and "overloaded" scenarios.

Figure 2A:
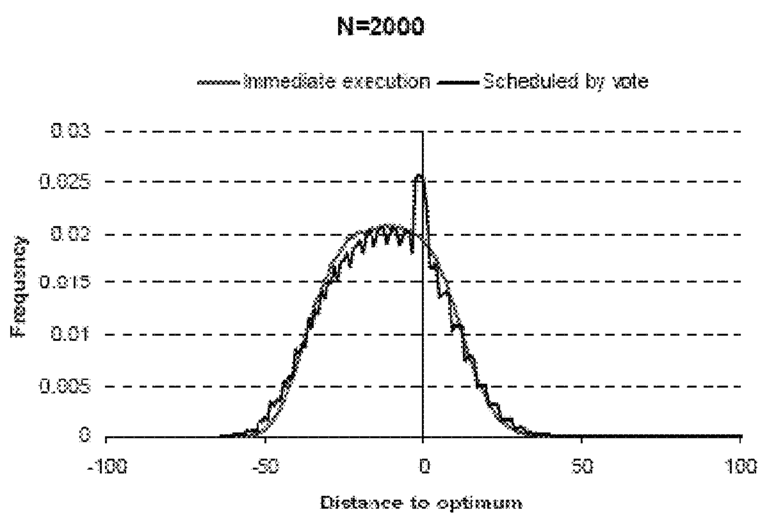
FIGS. 2*a*-2*c* show the modelling of the performance of a scheduling method according to an embodiment of the present invention compared to an existing scheduling method under 3 different operational conditions.
Figure 2B:
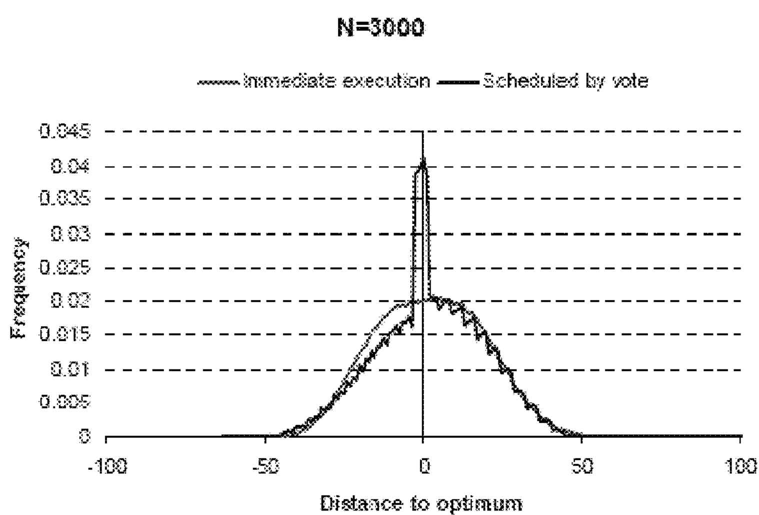
Figure 2C:
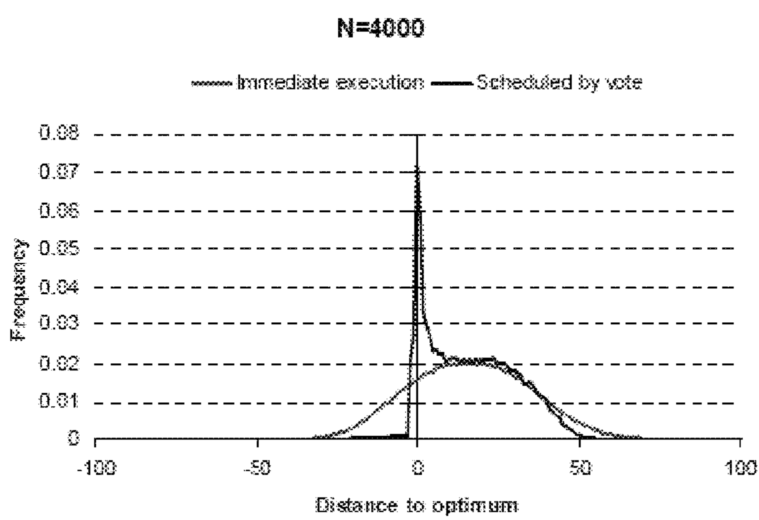

FIGS. 2-4 show the results of these simulations in the form of frequency distributions of time-slots, over 100 independent simulation runs for every combination of parameter values. FIG. 2 shows the results in relation to scenario 1 above (Random-Random), FIG. 3 shows the results in relation to scenario 2 above (Random-Sine) and FIG. 4 shows the results in relation to scenario 3 above (Sine-Cosine).

In FIGS. 2-4, the X axis of the frequency distribution plots the deviation from the target, i.e. Rc−R* (with Rc measured "after the facts" and so being the actual utilization that occurs in a particular time-slot as determined at the end of the experiment) and the Y axis plots the fraction of time-slots achieving that utilization.

Therefore a single peak reaching X=0, Y=1 would indicate that resource utilization was exactly on target for all 8,000 retained timeslots of every experiment. Given that perfect resource utilization is unlikely to occur, efficient scheduling should result in a narrow peak centered on a value as close as possible to zero, and the greater the area under the graph within a certain range either side of zero, the greater the overall efficiency of the scheduling. A distribution shifted towards negative values indicates that most time-slots saw underutilization, whilst a distribution shifted towards positive values indicates "overshooting" (most time slots saw above target utilization levels).

For comparison, every distribution produced in this simulation is compared to that which would result from the simplest known dynamic resource allocation procedure whereby execution of a task is started immediately and at a randomly chosen rate r (1, 2 or 4) as soon as it is submitted.

The method of the present embodiment demonstrates improved efficiency in scheduling in all scenarios and loadings considered as can be seen by increased peak(s) at or around the X=0 point and generally narrower distributions. Of course the exact efficiency gains will depend on the underlying system and the profile of the efficiency at the respective loads.

The method of the present embodiment is most effective (i.e. leads to greater improvement in the utilization profile) if the demand is high (N=3000 and N=4000 in all three scenarios) and the utilization target does not fluctuate randomly from time-slot to time-slot (scenarios 2) and 3)).

Figure 3A:
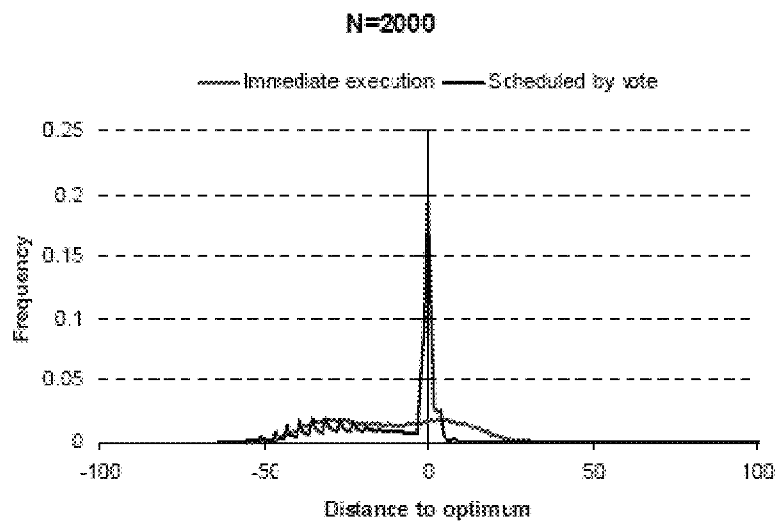
FIGS. 3*a*-3*c* show the modelling of the performance of a scheduling method according to an embodiment of the present invention compared to an existing scheduling method under 3 different operational conditions based on an alternative set of operational conditions.
Figure 3B:
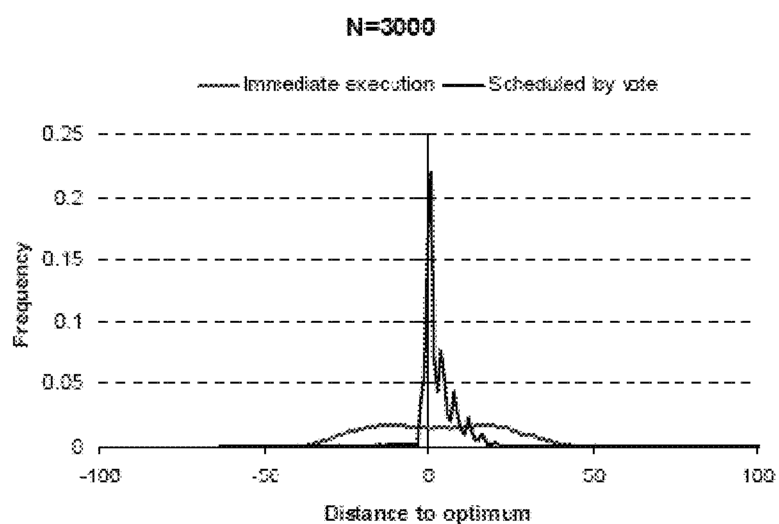
Figure 3C:
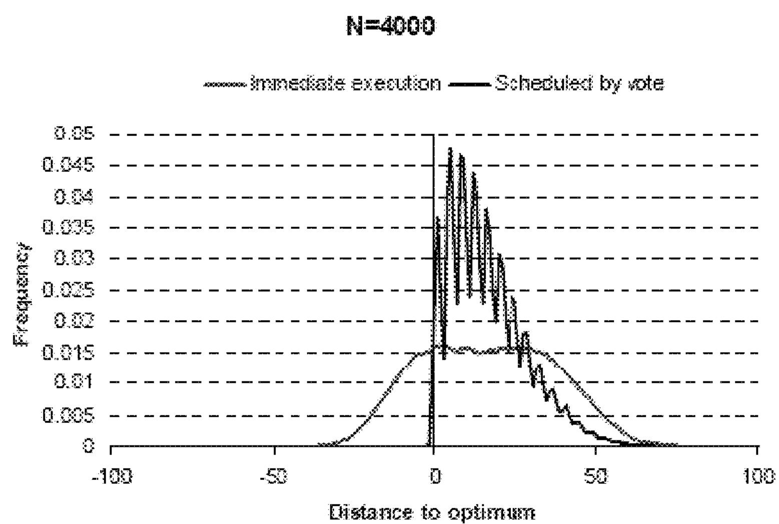
Figure 4A:
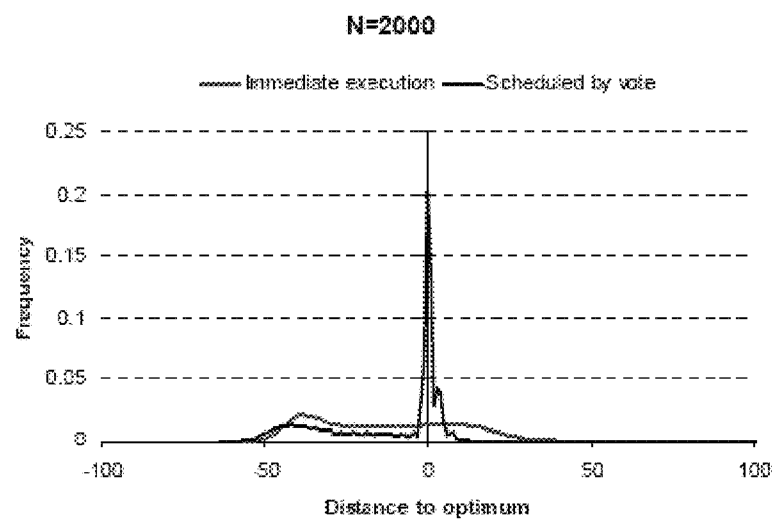
FIGS. 4*a*-4*c* show the modelling of the performance of a scheduling method according to an embodiment of the present invention compared to an existing scheduling method under 3 different operational conditions based on a further set of operational conditions.
Figure 4B:
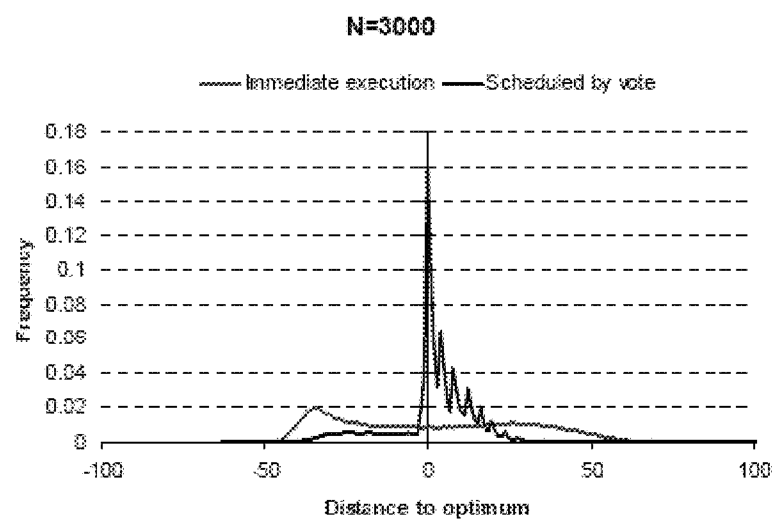
Figure 4C:
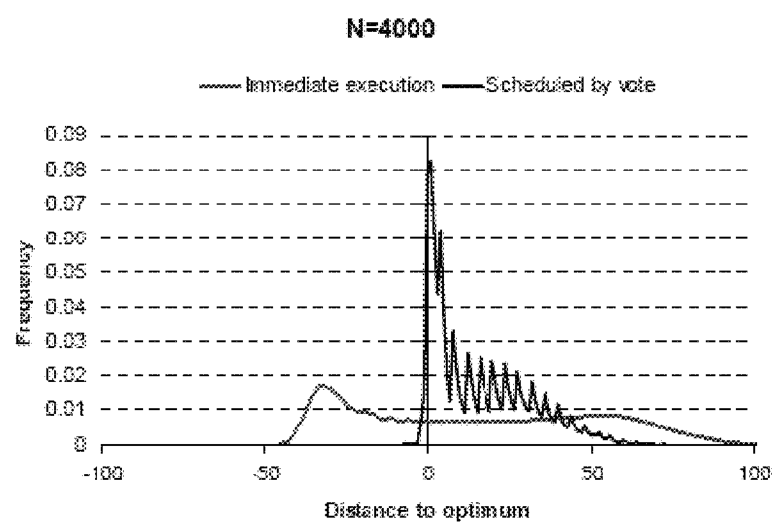

It is to be noted that there is little that can be done by any scheduling algorithm to improve under-utilization in a situation where the demand is consistently low (FIGS. 2*a*, 3*a*, 4*a*). However, it will be seen that the method of the present embodiment can be effective in reducing over-utilization in low demand situations where the utilization target is non-random (FIGS. 3*a* and 4*a*) and even in a low demand (N=2000) and random-random scenario (FIG. 2*a*), an increased peak at the optimum efficiency is observed.

For higher demands, the method of the present embodiment is particularly effective at reducing (or even effectively removing) under-utilization (see FIGS. 2*c*, 3*b*, 3*c* and 4*c*). This is because the voting algorithm set out operates essentially by limiting the likelihood of "overshooting", because already crowded execution windows tend to score comparatively low when new tasks are allocated (a higher proportion of "no" votes).

Part of the reason for the comparative improvement witnessed in the "worst-case" scenario (scenario 3) is because this is the situation in which immediate execution at submission time (which is used as the benchmark algorithm) has the strongest adverse effect on overall efficiency. This is shown in the very elongated and slightly bimodal distribution of the immediate execution plots in FIGS. 4*a*-4*c*, meaning that the majority of timeslots are either strongly under-utilized or heavily over-loaded. The asymmetry in this pattern comes from the fact that there is a lower limit of −64 (due to the fact that utilization Rc cannot drop below zero and the highest possible target R* is 64) and no upper limit. In these circumstances, the method of the present embodiment assists in restoring a roughly unimodal distribution, and, as demonstrated in FIGS. 4*a*-4*c* can achieve substantial benefits.

It is also to be noted that the method of this embodiment results in a particularly improved performance when utilization targets follow a regular pattern. This can be attributed to the simplification to restrict the allocation to contiguous time-slots, which results in the variance around the average target within a possible execution time window being statistically much smaller than in the random case. As a result, it is less likely that voters "disagree" to the same extent about admitting a task in scenarios 2 and 3 than they do in the random arrangement of scenario 1. In turn, this leads to a reduced noise level and to a lower probability that a large minority of timeslots which in fact vote "no" to particular allocations are forced to commit resources beyond their utilization target.

The method of the present embodiment is relatively simple (as noted in the discussion of the simplifications above). However, as demonstrated in the simulations illustrated, it is an effective method for reactive run-time scheduling that does not rely on global knowledge or historical data. Although the method of this embodiment cannot compete with offline methods for identifying or approximating the global optimum, it consistently leads to measurable improvements over immediate execution despite accepting all tasks and respecting all deadlines (which conventional admission controls do not necessarily guarantee).

It will be understood that although the method of the above embodiment was illustrated in the context of computing resources allocation, it can be applied to a wide variety of similar "loadshaping" problems.

In particular, embodiments of the present invention could be readily applied to or adapted to deal with demand-side management or demand response in power grids or other utility applications (oil, water, gas, etc.). In such embodiments the algorithm could be applied to the scheduling of electrical loads so as to reduce the chances of the loads exceeding the capacity of the grid ("peak shaving"). In this embodiment the "resources" above represent the capacity of the grid and the "tasks" are electrical load demands made by devices connected to the grid. In such embodiments, a control unit is provided which receives new load demands on the grid or other utility resource, determines a scheduling of those load demands using a method according to the present invention and arranges for the load demands to be run at the time determined by the scheduling.

Alternative embodiments of the present invention include the allocation of bandwidth in a communications pathway such as a telephone or computer network to users of that pathway.

Figure 5:
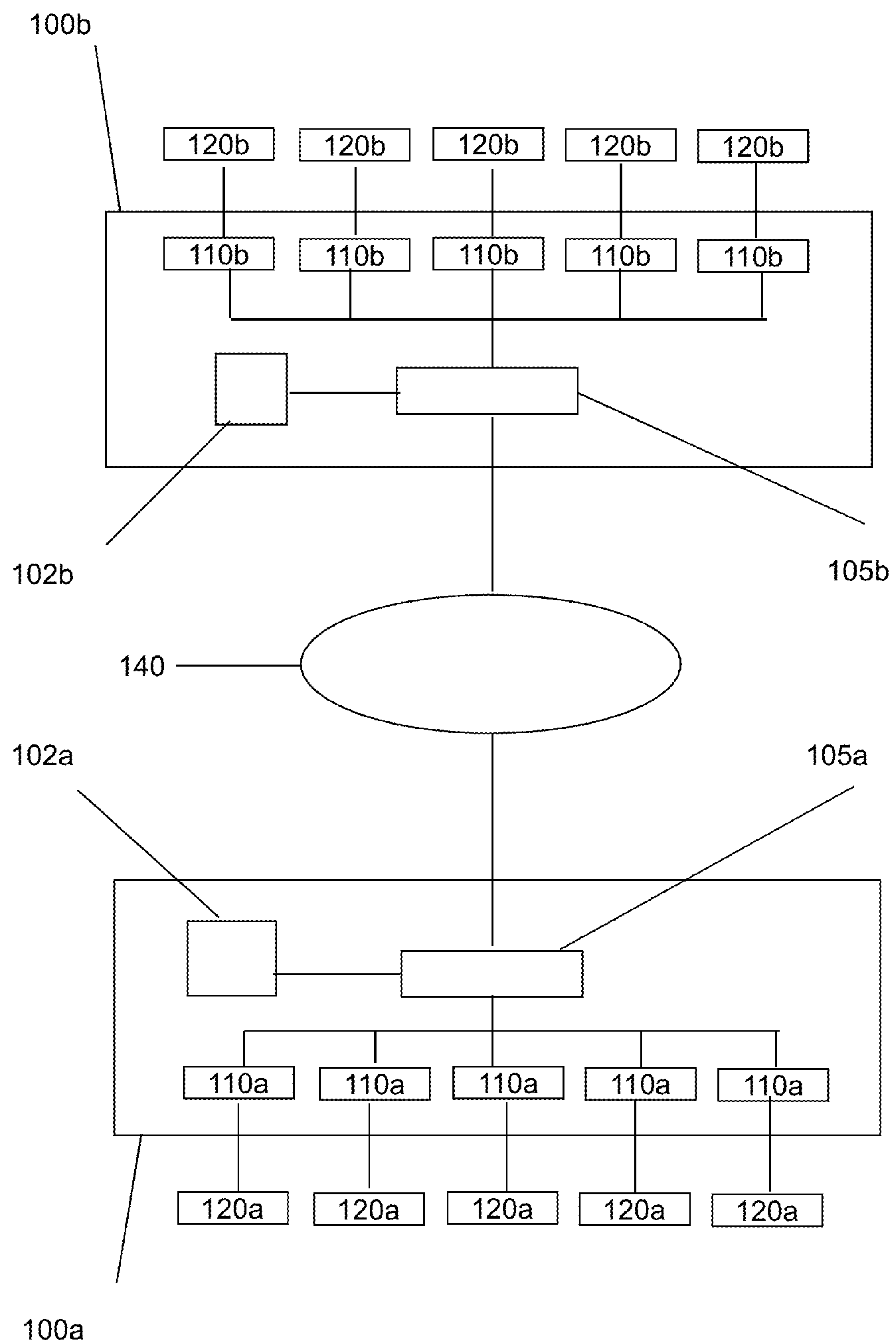
FIG. 5 is a schematic block diagram showing another exemplary embodiment.

FIG. 5 shows, in schematic form, an embodiment of the present invention which is a system for allocating bandwidth in a communications pathway such as a telephone or computer network 140. The system comprises two network controllers 100*a*, 100*b* which are essentially identical (respective components of each control unit are given the appropriate suffix "a" or "b" and only the numerical prefix will be used in the following description). Each network controller 100 is connected to a plurality of users 120 which may be telephone subscribers, data subscribers, a mixture of both, or any other users of the network 140. Users 120 pass their requests for use of the network 140 to one of the network controllers 100 through an interface 110. On receipt of a request from a user, a control unit 105 in the network controller 100 determines the resources of the network 140 which are required to complete that request and any deadline for the completion of the request. The control unit 105 then references a memory device 102 which stores information regarding the future utilization of the network and information regarding the optimal utilization of the network at future points in time and determines a preferred scheduling of the received request. The received request may then be stored in the memory device 102, along with the determined scheduling until it can be passed to the network 140.

Still further embodiments of the present invention relate to the management of demands on other finite resources such as production capacity in a factory or beds in a hospital. In each embodiment, a control unit may be provided which is arranged to receive new demands on the available resources and to determine a scheduling of those demands which results in optimization of the utilization of those resources.

The methods described above may be implemented in a computer system (in particular in computer hardware or in computer software).

The term "computer system" includes the hardware, software and data storage devices for embodying a system or carrying out a method according to the above described embodiments. For example, the computer system may comprise a central processing unit (CPU), input means, output means and data storage. As discussed in the example above, the CPU may be a multiple core CPU.

Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods described above may be provided as computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of scheduling demands on a system having a plurality of resources which can be allocated to said demands, the method including the steps of, on receipt of a new demand for resources:

a) determining the total resources required to complete said demand and a deadline for the completion of that demand;

b) determining a plurality of alternative resource allocations which will allow completion of the demand before the deadline;

c) for each of said alternative resource allocations, determining whether, based on allocations of resources to existing demands, said alternative resource allocation will result in a utilization of resources which is closer to an optimum utilization of said resources; and d) selecting, based on said determination in step c), one of said alternative resource allocations to complete said demand so as to optimize utilisation of resources of the system; and wherein the optimum utilisation of the resources of the system varies with time; and wherein said alternative resource allocations include starting said demand at a plurality of different start times between the time of receipt of the demand and the deadline, wherein said step c) of determining includes the sub-steps of:

c1) determining, for each of a plurality of timeslots between the time of receipt of the new demand and the deadline, whether, based on allocations of resources to existing demands, said alternative resource allocation will result in a utilization of resources in said timeslot which is closer to an optimum utilization for said timeslot; and c2) collating the results of said determination in step c1) to generate a value indicating the desirability of each of said alternative resource allocations; and wherein said step d) of selecting selects based on said generated values; and wherein if a plurality of alternative resource allocations result in generation of said values which are equal, the step of selecting selects the alternative resource allocation which starts earliest in time.

2. The method according to claim 1 wherein said alternative resource allocations include the allocation of different amounts of said resources to said demand at a particular point in time.

3. The method according to claim 1 wherein said value is the proportion of said plurality of timeslots in which said alternative resource allocation will result in a utilization of resources which is closer to an optimum utilization for said timeslot.

4. The method according to claim 1 wherein said step d) of selecting selects the alternative resource allocation with the highest value.

5. The method according to claim 1 wherein said system comprises a computer system and said demands are tasks to be performed by said computer system.

6. The method according to claim 1 wherein said system comprises an electrical grid and said demands are loads on said grid.

7. A processor system having a plurality of resources which are allocatable to demands requested by one or more users of the system, the processor system further comprising a resource allocation device which is arranged to determine allocation of said resources to said demands, wherein, on receipt of a new demand for resources, the resource allocation device is arranged to:

a) determine the total resources required to complete said demand and a deadline for the completion of that demand;

b) determine a plurality of alternative resource allocations which will allow completion of the demand before the deadline;

c) for each of said alternative resource allocations, determine whether, based on allocations of resources to existing demands, said alternative resource allocation will result in a utilization of resources which is closer to an optimum utilization of said resources;

d) select, based on said determination in c) above, one of said alternative resource allocations to complete said demand so as to optimize utilisation of resources of the system, and further wherein said system allocates resources to said demand according to the alternative resource allocation selected; and wherein the optimum utilisation of the resources of the system varies with time; and wherein said alternative resource allocations include starting said demand at a plurality of different start times between the time of receipt of the demand and the deadline; and wherein said resource allocation device is further arranged to:

determine, for each of a plurality of timeslots between the time of receipt of the new demand and the deadline, whether, based on allocations of resources to existing demands, said alternative resource allocation will result in a utilization of resources in said timeslot which is closer to an optimum utilization for said timeslot;

collate the results of said determinations for the plurality of timeslots to generate a value indicating the desirability of each of said alternative resource allocations; and select one of said alternative resource allocations based on said generated values; and wherein if a plurality of alternative resource allocations result in generation of said values which are equal, the resource allocation device is arranged to select the alternative resource allocation which starts earliest in time.

8. The processor system according to claim 7 wherein said alternative resource allocations include the allocation of different amounts of said resources to said demand at a particular point in time.

9. The processor system according to claim 7 wherein said value is the proportion of said plurality of timeslots in which said alternative resource allocation will result in a utilization of resources which is closer to an optimum utilization for said timeslot.

10. The processor system according to claim 7 wherein said resource allocation device is arranged to select the alternative resource allocation with the highest value.

11. The processor system according to claim 7 wherein said system comprises a computer system and said demands are tasks to be performed by said computer system.

12. The processor system according to claim 11 wherein said resources are processor time.

13. The processor system according to claim 12 wherein the system comprises a computer system having multiple processor cores and the resources are the provision of one or more of said processor cores for a predetermined time period.

14. A method of scheduling demands on a system having a plurality of resources which can be allocated to said demands, the method including the steps of, on receipt of a new demand for resources:

a) determining the total resources required to complete said demand and a deadline for the completion of that demand;

b) determining a plurality of alternative resource allocations which will allow completion of the demand before the deadline;

c) for each of said alternative resource allocations, determining whether, based on allocations of resources to existing demands, said alternative resource allocation will result in a utilization of resources which is closer to an optimum utilization of said resources; and d) selecting, based on said determination in step c), one of said alternative resource allocations to complete said demand so as to optimize utilisation of resources of the system;

wherein said alternative resource allocations include starting said demand at a plurality of different start times between the time of receipt of the demand and the deadline; and wherein said step c) of determining includes the sub-steps of:

c1) determining, for each of a plurality of timeslots between the time of receipt of the new demand and the deadline, whether, based on allocations of resources to existing demands, said alternative resource allocation will result in a utilization of resources in said timeslot which is closer to an optimum utilization for said timeslot; and c2) collating the results of said determination in step c1) to generate a value indicating the desirability of each of said alternative resource allocations;

wherein said step d) of selecting selects based on said generated values; and wherein said value is the proportion of said plurality of timeslots in which said alternative resource allocation will result in a utilization of resources which is closer to an optimum utilization for said timeslot.

15. The method according to claim 14 wherein the optimum utilisation of the resources of the system varies with time.

16. The method according to claim 14 wherein said alternative resource allocations include the allocation of different amounts of said resources to said demand at a particular point in time.

17. The method according to claim 14 wherein said step d) of selecting selects the alternative resource allocation with the highest value.

18. The method according to claim 14 wherein if a plurality of alternative resource allocations result in generation of said values which are equal, the step of selecting selects the alternative resource allocation which starts earliest in time.

19. The method according to claim 14 wherein said system comprises a computer system and said demands are tasks to be performed by said computer system.

20. The method according to claim 14 wherein said system comprises an electrical grid and said demands are loads on said grid.

21. A processor system having a plurality of resources which are allocatable to demands requested by one or more users of the system, the processor system further comprising a resource allocation device which is arranged to determine allocation of said resources to said demands, wherein, on receipt of a new demand for resources, the resource allocation device is arranged to:

a) determine the total resources required to complete said demand and a deadline for the completion of that demand;

b) determine a plurality of alternative resource allocations which will allow completion of the demand before the deadline;

c) for each of said alternative resource allocations, determine whether, based on allocations of resources to existing demands, said alternative resource allocation will result in a utilization of resources which is closer to an optimum utilization of said resources;

d) select, based on said determination in c) above, one of said alternative resource allocations to complete said demand so as to optimize utilisation of resources of the system, and further wherein said system allocates resources to said demand according to the alternative resource allocation selected; and wherein said alternative resource allocations include starting said demand at a plurality of different start times between the time of receipt of the demand and the deadline;

wherein said resource allocation device is further arranged to:

determine, for each of a plurality of timeslots between the time of receipt of the new demand and the deadline, whether, based on allocations of resources to existing demands, said alternative resource allocation will result in a utilization of resources in said timeslot which is closer to an optimum utilization for said timeslot;

collate the results of said determinations for the plurality of timeslots to generate a value indicating the desirability of each of said alternative resource allocations; and select one of said alternative resource allocations based on said generated values; and wherein said value is the proportion of said plurality of timeslots in which said alternative resource allocation will result in a utilization of resources which is closer to an optimum utilization for said timeslot.

22. The processor system according to claim 21 wherein the optimum utilisation of the resources of the system varies with time.

23. The processor system according to claim 21 wherein said alternative resource allocations include the allocation of different amounts of said resources to said demand at a particular point in time.

24. The processor system according to claim 21 wherein said resource allocation device is arranged to select the alternative resource allocation with the highest value.

25. The processor system according to claim 21 wherein if a plurality of alternative resource allocations result in generation of said values which are equal, the resource allocation device is arranged to select the alternative resource allocation which starts earliest in time.

26. The processor system according to claim 21 wherein said system comprises a computer system and said demands are tasks to be performed by said computer system.

27. The processor system according to claim 26 wherein said resources are processor time.

28. The processor system according to claim 27 wherein the system comprises a computer system having multiple processor cores and the resources are the provision of one or more of said processor cores for a predetermined time period.

29. The processor system according to claim 21 wherein said system comprises an electrical grid and said demands are loads on said grid.

* * * * *